(12) United States Patent
Kao

(10) Patent No.: US 11,043,324 B2
(45) Date of Patent: Jun. 22, 2021

(54) METHOD FOR MANUFACTURING A MAGNETIC CORE OF AN ELECTRIC VEHICLE MOTOR

(71) Applicant: MENG SIN MATERIAL CO., LTD, Pingtung County (TW)

(72) Inventor: Meng-Tsung Kao, Kaohsiung (TW)

(73) Assignee: MENG SIN MATERIAL CO., LTD, Pingtung County (TW)

( * ) Notice: Subject to any disclaimer, the term of this patent is extended or adjusted under 35 U.S.C. 154(b) by 8 days.

(21) Appl. No.: 16/791,580

(22) Filed: Feb. 14, 2020

(65) Prior Publication Data
US 2021/0098178 A1    Apr. 1, 2021

(30) Foreign Application Priority Data

Sep. 26, 2019  (TW) .................................. 108134898

(51) Int. Cl.
| | |
|---|---|
| H01F 7/06 | (2006.01) |
| H01F 27/26 | (2006.01) |
| H01F 41/22 | (2006.01) |
| H01F 41/02 | (2006.01) |
| H01F 41/32 | (2006.01) |

(52) U.S. Cl.
CPC ....... *H01F 27/263* (2013.01); *H01F 41/0233* (2013.01); *H01F 41/22* (2013.01); *H01F 41/32* (2013.01)

(58) Field of Classification Search
CPC ..... H01F 27/263; H01F 41/0233; H01F 41/22
See application file for complete search history.

(56) References Cited

U.S. PATENT DOCUMENTS

| 5,679,762 A | * | 10/1997 | Yoshida | ................ | C08F 293/00 |
|---|---|---|---|---|---|
| | | | | | 528/364 |
| 2008/0238237 A1 | * | 10/2008 | Nishihama | ........... | H02K 17/165 |
| | | | | | 310/166 |
| 2021/0083534 A1 | * | 3/2021 | Takazawa | .............. | H02K 1/276 |

FOREIGN PATENT DOCUMENTS

| CN | 109155574 A | 1/2019 |
|---|---|---|
| EP | 1555718 B1 | 12/2007 |
| JP | 2005-191033 A | 7/2005 |
| TW | 201629997 A | 8/2016 |
| TW | 201926861 A | 7/2019 |
| WO | 96/22840 A1 | 8/1996 |

\* cited by examiner

*Primary Examiner* — Paul D Kim
(74) *Attorney, Agent, or Firm* — Maschoff Brennan

(57) ABSTRACT

A method for manufacturing a magnetic core of an electric vehicle motor comprises: providing an electrical steel sheet and a release film; a heating step which heats the electrical steel sheet; an adhering step which adheres the release film to the heated electrical steel sheet; a removing step which removes the release film to leave the glue layer on the electrical steel sheet; a stacking step; a repeating step which repeats the heating step, the adhering step, the removing step and the stacking step to form a multi-layer structure having the electrical steel sheets and the glue layers interleaved stacked; and a solidifying step which heats the multi-layer structure to solidify the glue layers. Through the above steps, the thickness of the glue layer in the magnetic core would be uniform.

5 Claims, 5 Drawing Sheets

METHOD FOR MANUFACTURING A MAGNETIC CORE OF AN ELECTRIC VEHICLE MOTOR

TECHNICAL FIELD

The present invention relates to a magnetic core of a motor, and more particularly to a method for manufacturing a magnetic core of an electric vehicle motor.

BACKGROUND

A magnetic core of a motor plays an important role for efficiency of motor operation. While the efficiency is considered, for example, for an electric vehicle, the magnetic core of motor is usually made of multiple electrical steel sheets to reduce the eddy current loss.

There are two conventional methods for combining the multiple electrical steel sheets to form a magnetic core, including: a laser welding method and an adhering method. The laser welding method is a method that applies a laser to weld together the side edges of the stacked electrical steel sheets to form a magnetic core. However, such method would damage the edge of the magnetic core to thus cause the magnetic field to be affected when being operated such that the efficiency would be reduced. The adhering method is a method that sprays glue on all of the electrical steel sheets prior to stacking these sheets. However, it is difficult to evenly apply the glue on the electrical steel sheets, and it is difficult to form a glue layer with a thickness of a few micrometers as well. The thicker the glue layer is, the lower the rated efficiency and the stacking rate are. In addition, the spaying material is wasted because some of the glue would be dissipated into the air during spraying operation.

SUMMARY

Accordingly, one objective of the present invention is to provide a method for manufacturing a magnetic core of an electric vehicle motor to solve the problem mentioned above.

In order to overcome the technical problems in prior art, the present invention provides a method for manufacturing a magnetic core of an electric vehicle motor, comprising: providing an electrical steel sheet and a release film, and an adhering surface of the release film being coated with a glue layer; a heating step which heats the electrical steel sheet; an adhering step which adheres the adhering surface of the release film to the heated electrical steel sheet; a removing step which removes the release film from the heated electrical steel sheet to leave the glue layer on the adhered electrical steel sheet, the electrical steel sheet with the glue layer being used as an adhering electrical steel sheet; a stacking step which adheres another electrical steel sheet to the adhering electrical steel sheet or adheres the adhering electrical steel sheet to another adhering electrical steel sheet; a repeating step which repeats the above sequential steps of the heating step, the adhering step, the removing step and the stacking step to form a multi-layer structure having the electrical steel sheets and the glue layers interleaved stacked; and a solidifying step which heats the multi-layer structure to solidify the glue layers.

According to an embodiment of the present invention, the method further comprises, prior to providing an electrical steel sheet and a release film, a step, using a precision coating machine, of applying glue to the adhering surface of the release film to form the glue layer.

According to an embodiment of the present invention, a thickness of the glue layer is no greater than 2 um.

According to an embodiment of the present invention, in the heating step, a high frequency induction heating is performed on the electrical steel sheet.

According to an embodiment of the present invention, in the solidifying step, a high frequency induction heating is performed on the multi-layer structure.

According to the technical means adopted by of the method for manufacturing the magnetic core of the electric vehicle motor of the present invention, the release film is provided to fully transfer the glue layer to the electrical steel sheet such that the uniform thickness of the glue layer could be ensured. In addition, the edge of the magnetic core would not be damaged since a laser is not necessary to apply to weld together the side edges of electrical steel sheets. Furthermore, the thickness of the glue layer applied on the release film could be thinner than the thickness of the glue sprayed on the electrical steel sheets such that the glue layer of the magnetic core manufactured by the method of the present invention could be thinner than the glue layer of the magnetic core manufactured by the conventional adhering methods to raise the rated efficiency, stacking rate and the structural strength of the magnetic core.

DETAILED DESCRIPTION OF THE PREFERRED EMBODIMENTS

The preferred embodiments of the present invention are described in detail below with reference to FIG. 1 to FIG. 5. The description is used for explaining the embodiments of the present invention only, but not for limiting the scope of the claims.

Figure 1:
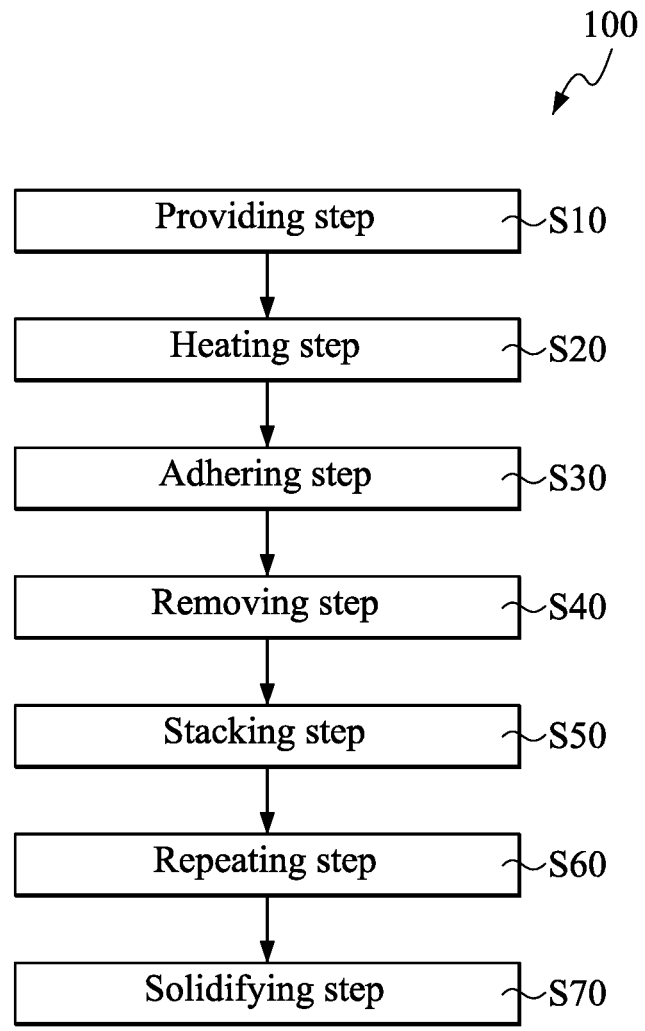
FIG. 1 is a flow chart of a method for manufacturing a magnetic core of an electric vehicle motor according to a first embodiment of the present invention.
Figure 4:
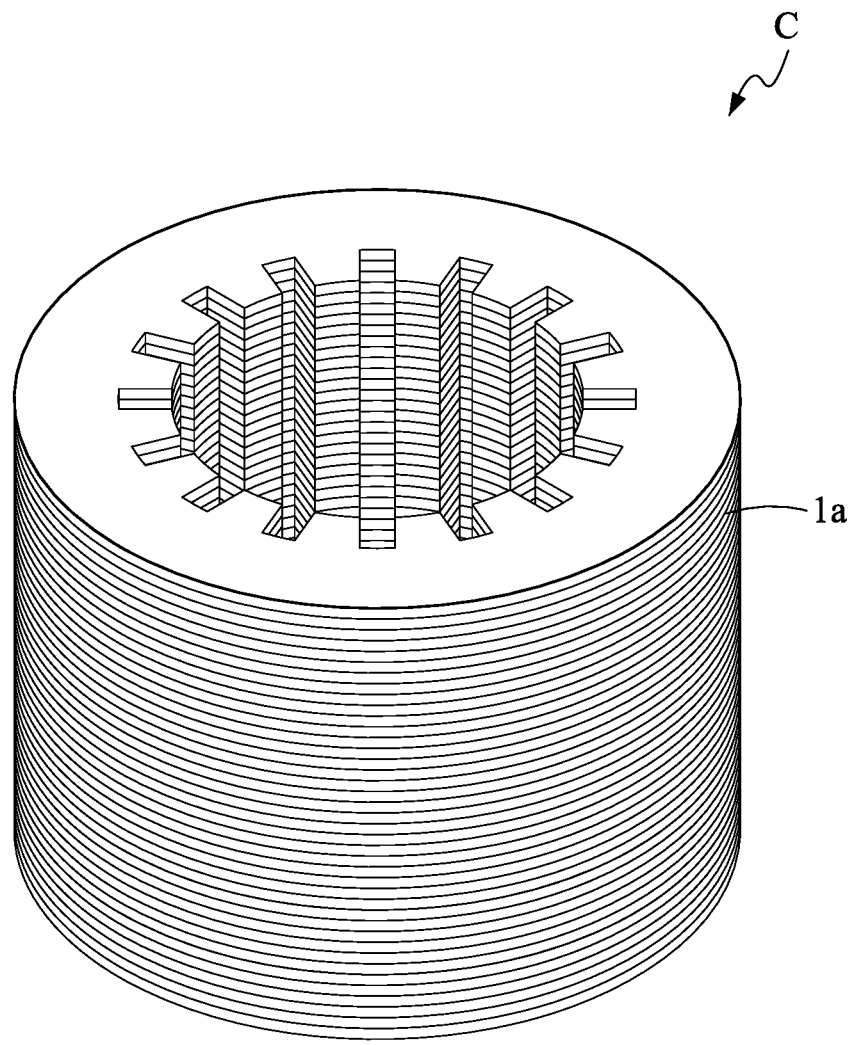
FIG. 4 is a schematic drawing of the magnetic core of the electric vehicle motor manufactured by the method according to the first embodiment of the present invention.

As shown in FIG. 1 and FIG. 4, according to one embodiment of the present invention, a method for manufacturing a magnetic core of an electric vehicle motor 100 comprises: a providing step S10, an heating step S20, an adhering step S30, a removing step S40, a stacking step S50, a repeating step S60 and a solidifying step S70, wherein the providing step S10 is to provide an electrical steel sheet 1 and a release film 2, and a adhering surface 21 of the release film 2 is coated with a glue layer 3;

the heating step S20 is to heat the electrical steel sheet 1;

the adhering step S30 is to adhere the adhering surface 21 of the release film 2 to the heated electrical steel sheet 1;

the removing step S40 is to remove the release film 2 from the heated electrical steel sheet 1 to leave the glue layer 3 on the adhered electrical steel sheet 1, and the electrical steel sheet 1 with the glue layer 3 is used as the adhering electrical steel sheet 1a;

the stacking step S50 is to adhere another electrical steel sheet 1 to the adhering electrical steel sheet 1a or adheres the adhering electrical steel sheet 1a to another adhering electrical steel sheet 1a;

the repeating step S60 is to repeat the above sequential steps of the heating step S20, the adhering step S30, the removing step S40 and the stacking step S50 to form a multi-layer structure having the electrical steel sheets 1 and the glue layers 3 interleaved stacked; and the solidifying step S70 is to heat the multi-layer structure to solidify the glue layers 3.

In detail, according to the first embodiment of the method for manufacturing a magnetic core of an electric vehicle motor 100 of the present invention, in the providing step S10, the electrical steel sheet 1 is in form of strip steel, and the release film 2 is in form of a roll, wherein a thickness of the glue layer 3 on the release film 2 is no greater than 2 um. Preferably, the thickness of the glue layer 3 on the release film 2 is between 0.5 um and 1 um.

According to the first embodiment of the method for manufacturing a magnetic core of an electric vehicle motor 100 of the present invention, in the heating step S20, preferably, a high frequency induction heating is performed on the electrical steel sheet 1. That is, a high frequency current induces an induced current in the electrical steel sheet 1 to raise the temperature of the electrical steel sheet 1 to 70-220° C. By performing the heating step S20, the temperature of the electrical steel sheet 1 is raised to a degree that enables the glue layer 3 on the release film 2 to adhere to the electrical steel sheet 1. In other embodiments, the heating step S20 can be performed by burning fuels such as liquefied petroleum gas (LPG) to heat the electrical steel sheet 1. Compared with burning fuels, high frequency induction heating could be provided with lower carbon emission and be more eco-friendly such that the manufactured magnetic core C of the motor has lower carbon footprint.

Figure 2:
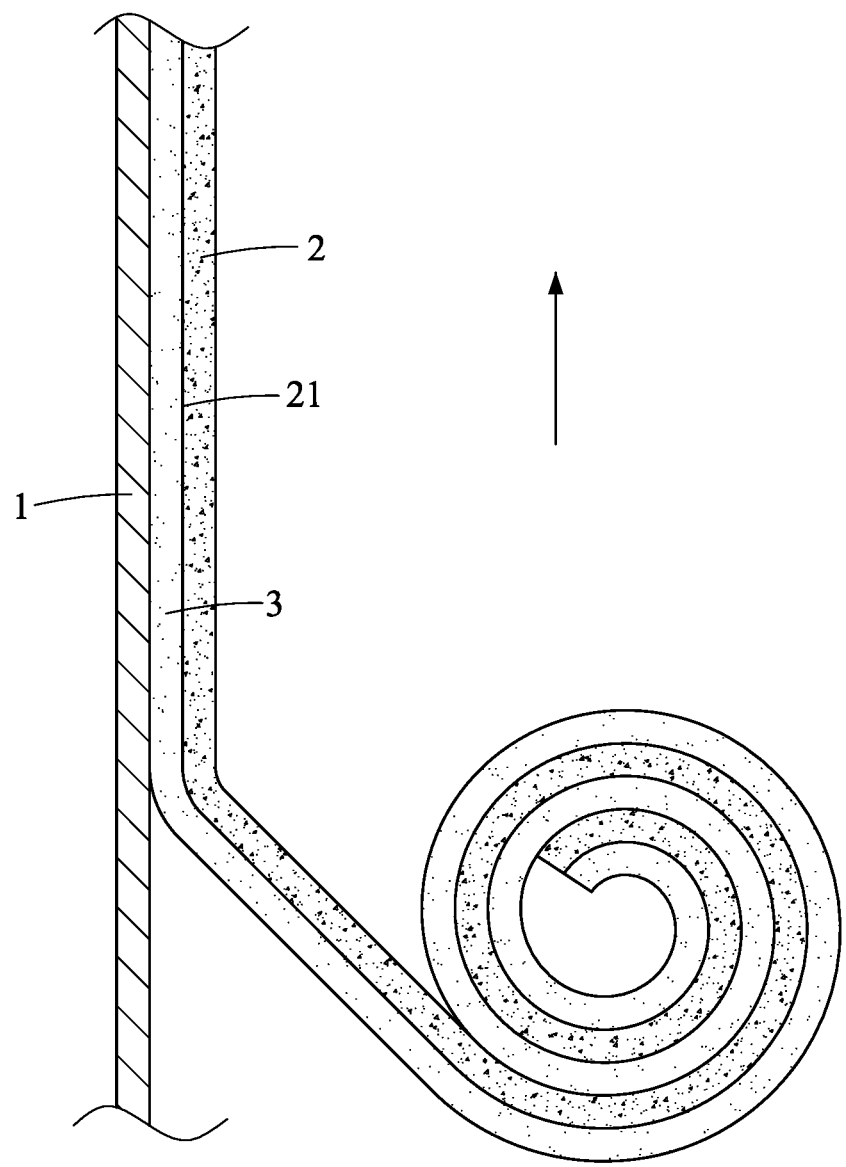
FIG. 2 is a schematic drawing of an adhering step of the method for manufacturing the magnetic core of the electric vehicle motor according to the first embodiment of the present invention.

As shown in FIG. 2, an arrow indicates the moving direction of the electrical steel sheet 1 by a conveyor belt. According to the first embodiment of the method for manufacturing a magnetic core of an electric vehicle motor 100 of the present invention, in the adhering step S30, the adhering surface 21 of the release film 2 is adhered to the heated electrical steel sheet 1, wherein the adhering surface 21 of the release film 2 can be adhered to one or two sides of the heated electrical steel sheet 1. The relationship of thickness among the electrical steel sheet 1, the release film 2 and the glue layer 3 shown in the drawing is merely representative in which they do not with actual thickness relationships.

Figure 3:
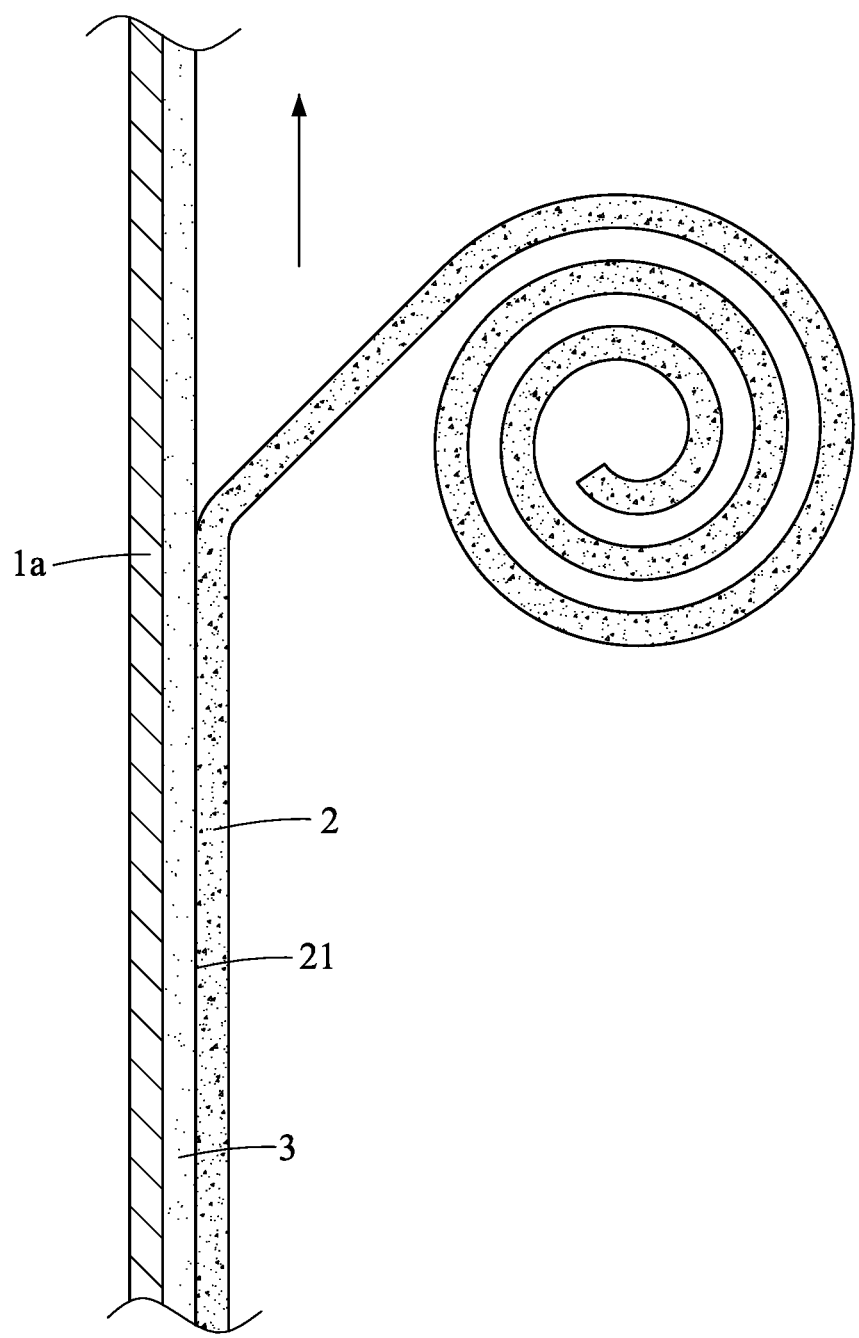
FIG. 3 is a schematic drawing of a removing step of the method for manufacturing the magnetic core of the electric vehicle motor according to the first embodiment of the present invention.

According to the first embodiment of the method for manufacturing a magnetic core of an electric vehicle motor 100 of the present invention as shown in FIG. 3, in the removing step S40, in the case that the release film 2 is wrapped into a roll, the release film 2 is removed from the electrical steel sheet 1 to leave the glue layer 3 on the adhered electrical steel sheet 1. The electrical steel sheet 1 with the glue layer 3 is used as an adhering electrical steel sheet 1a. An arrow indicates the moving direction of the electrical steel sheet 1a by a conveyor belt. In addition, the relationship of thickness between electrical steel sheet 1, the release film 2 and the glue layer 3 shown in the drawing is merely representative in which they do not with actual thickness relationships.

By performing the adhering step S30 and the removing step S40, the glue layer 3 on the adhering surface 21 of the release film 2 can be fully transferred to the electrical steel sheet 1 such that the uniform thickness of the glue layer 3 on the adhering electrical steel sheet 1a could be ensured, and the waste caused by dissipation of the glue in the air could be avoided. In addition, the edge of the magnetic core would not be damaged since a laser is not necessary to apply to weld the side edge of electrical steel sheets.

According to the first embodiment of the method for manufacturing a magnetic core of an electric vehicle motor 100 of the present invention, after the removing step S40, the strip-shaped adhering electrical steel sheet 1a is cut into multiple pieces having the same size in the present embodiment. In other embodiments, the electrical steel sheet 1 provided in the providing step S10 could be in form of multiple pieces having the same size, and therefore after the removing step S40, cutting the electrical steel sheet 1 is not required.

According to the first embodiment of the method for manufacturing a magnetic core of an electric vehicle motor 100 of the present invention, the glue layer 3 is on the upper surface of the adhering electrical steel sheet 1a. In other embodiments, the glue layer 3 is on the upper surface and lower surface of the adhering electrical steel sheet 1a. In the stacking step S50, the electrical steel sheet 1 is adhered to the adhering electrical steel sheet 1a by enabling the center of another electrical steel sheet 1 to align to the center of the adhering electrical steel sheet 1a. Alternatively, the adhering electrical steel sheet 1a is adhered to the said another adhering electrical steel sheet 1a by having the glue layer 3 the adhering electrical steel sheet 1a facing upward to enable the center of the adhering electrical steel sheet 1a to align to another adhering electrical steel sheet 1a.

In this embodiment, the repeating step S60 is for repeating the above sequential steps including the heating step 20, the adhering step 30, the removing step 40 and the stacking step 50 during the strip steel is being transported so as to form a multi-layer structure until the number of the adhering electrical steel sheets 1a reaches the target value. The multi-layer structure is formed as shown in FIG. 4. In the case that the electrical steel sheet 1 provided in the providing step S10 is in form of strip steel, the strip-shaped adhering electrical steel sheet 1a is cut into multiple pieces having the same size between the removing step S40 and the stacking step S50.

According to the first embodiment of the method for manufacturing a magnetic core of an electric vehicle motor 100 of the present invention, in the solidifying step S70, preferably, a high frequency induction heating is performed on the multi-layer structure, which has lower carbon emission and is more eco-friendly compared with burning fuels for heating. By the solidifying step S70, the temperature of the electrical steel sheet 1 is raised to a degree that enables the glue layer 3 to be solidified. Since the heating step S20 and the solidifying step S70 both utilize high frequency induction heating, the magnetic core C of the motor manufactured can have even lower carbon footprint. In other embodiments, the solidifying step S70 can be performed by burning fuels such as liquefied petroleum gas (LPG) to heat the electrical steel sheet 1. Alternatively, the solidifying step S70 further includes not only heating the he multi-layer structure but also pressurizing the multi-layer structure.

Figure 5:
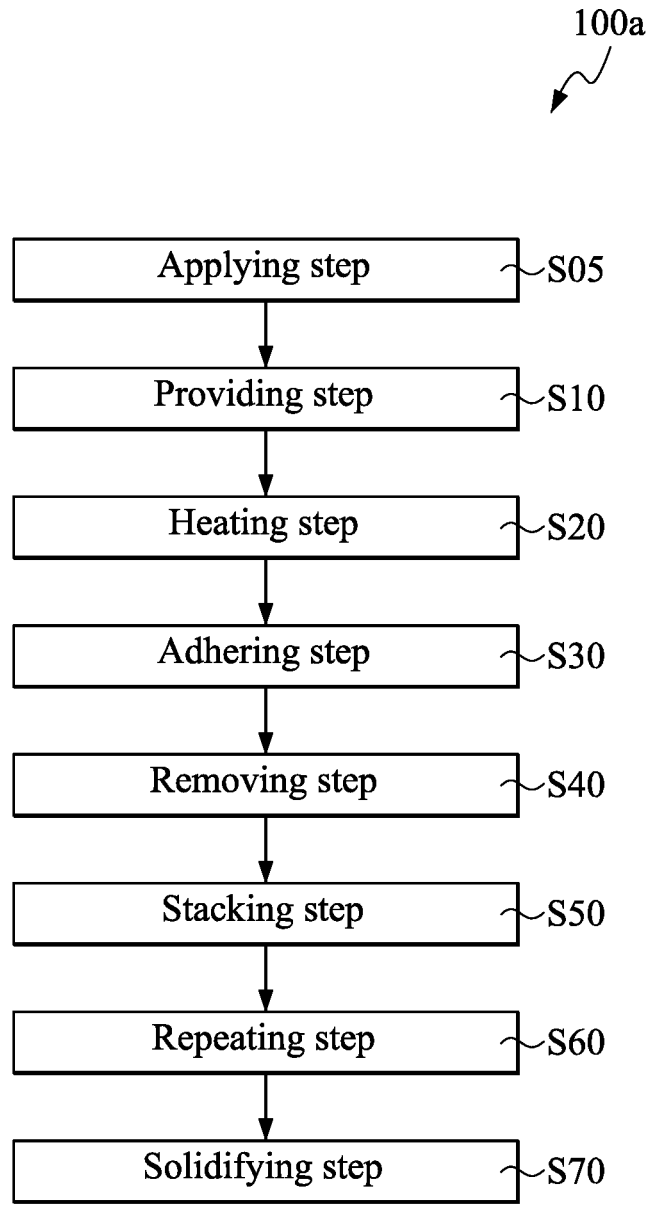
FIG. 5 is a flow chart of the method for manufacturing the magnetic core of the electric vehicle motor according to the second embodiment of the present invention.

As shown in FIG. 5, according to a second embodiment of the present invention, the method 100a is similar to these shown in the first embodiment of the present invention. The difference is that the method 100a further comprises, prior to the providing step S10, an applying step S05. The applying step S05 uses a precision coating machine to apply glue on the adhering surface 21 of the release film 2 to form the glue layer 3. The thickness of the glue layer 3 is not greater than 2 um. Preferably, the thickness of the glue layer 3 on the release film 2 is between 0.5 um and 1 um. By determining the thickness of the applied glue layer 3, the thickness of the glue layer 3 in the manufactured magnetic core C can be correspondingly determined.

By performing the steps mentioned above, the thickness of the entire glue layer 3 in the manufactured magnetic core C is uniform. In addition, the thickness of the glue layer 3 applied on the release film 2 can be less than the thickness of the glue sprayed on the electrical steel sheets such that the glue layer 3 of the magnetic core C manufactured by the method for manufacturing a magnetic core of an electric vehicle motor 100, 100a the present invention can be thinner than the glue layer of the magnetic core manufactured by the conventional adhering methods to raise the rated efficiency and the structural strength of the magnetic core.

The above description should be considered as only the discussion of the preferred embodiments of the present invention. A person having ordinary skill in the art may make various modifications to the present invention. However, those modifications still fall within the spirit of the present invention and the scope defined by the appended claims.

What is claimed is:

1. A method for manufacturing a magnetic core of an electric vehicle motor, comprising:
   providing an electrical steel sheet and a release film, and an adhering surface of the release film being coated with a glue layer;
   a heating step which heats the electrical steel sheet;
   an adhering step which adheres the adhering surface of the release film to the heated electrical steel sheet;
   a removing step which removes the release film from the heated electrical steel sheet to leave the glue layer on the adhered electrical steel sheet, the electrical steel sheet with the glue layer being used as an adhering electrical steel sheet;
   a stacking step which adheres another electrical steel sheet to the adhering electrical steel sheet or adheres the adhering electrical steel sheet to another adhering electrical steel sheet;
   a repeating step which repeats the above sequential steps of the heating step, the adhering step, the removing step and the stacking step to form a multi-layer structure having the electrical steel sheets and the glue layers interleaved stacked; and
   a solidifying step which heats the multi-layer structure to solidify the glue layers.

2. The method for manufacturing a magnetic core of an electric vehicle motor of claim 1, further comprising, prior to providing the electrical steel sheet and the release film, a step, using a precision coating machine, applying a glue to the adhering surface of the release film to form the glue layer.

3. The method for manufacturing a magnetic core of an electric vehicle motor of claim 1, wherein a thickness of the glue layer is no greater than 2 um.

4. The method for manufacturing a magnetic core of an electric vehicle motor of claim 1, wherein in the heating step, a high frequency induction heating is performed on the electrical steel sheet.

5. The method for manufacturing a magnetic core of an electric vehicle motor of claim 1, wherein in the solidifying step, a high frequency induction heating is performed on the multi-layer structure.

* * * * *